United States Patent
Landry et al.

(10) Patent No.: US 11,483,412 B2
(45) Date of Patent: Oct. 25, 2022

(54) METHOD FOR MARSHALLING EVENTS IN A PUBLISH-SUBSCRIBE SYSTEM

(71) Applicant: BlackBerry Limited, Waterloo (CA)

(72) Inventors: Nicholas Ivan Landry, Etobicoke (CA); Ashkan Amiri, Oakville (CA); Geordon Thomas Ferguson, Mississauga (CA); Biswaroop Mukherjee, Stittsville (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 17/137,494

(22) Filed: Dec. 30, 2020

(65) Prior Publication Data
US 2022/0210239 A1  Jun. 30, 2022

(51) Int. Cl.
*H04L 67/562* (2022.01)
*G06N 20/00* (2019.01)
*H04L 67/10* (2022.01)

(52) U.S. Cl.
CPC .......... *H04L 67/562* (2022.05); *G06N 20/00* (2019.01); *H04L 67/10* (2013.01)

(58) Field of Classification Search
CPC ...... H04L 67/2809; H04L 67/10; G06N 20/00
See application file for complete search history.

(56) References Cited

U.S. PATENT DOCUMENTS

| | | | |
|---|---|---|---|
| 6,314,533 B1 * | 11/2001 | Novik | G06F 16/24568 714/39 |
| 7,331,049 B1 * | 2/2008 | Jin | H04L 67/10 709/201 |
| 7,587,517 B2 * | 9/2009 | Huang | H04L 45/306 709/227 |
| 8,244,908 B2 | 8/2012 | Dempo | |
| 9,026,567 B2 | 5/2015 | Dodge | |
| 10,135,938 B2 | 11/2018 | Dodge | |
| 10,666,712 B1 | 5/2020 | Dandekar et al. | |
| 11,032,383 B2 * | 6/2021 | Ruiz-Meraz | H04L 51/14 |
| 11,144,613 B2 | 10/2021 | Perron et al. | |
| 2002/0143857 A1 | 10/2002 | Bidarahalli et al. | |
| 2003/0226109 A1 * | 12/2003 | Adamson | G06F 8/20 707/999.1 |
| 2006/0088014 A1 | 5/2006 | Ganesh | |

(Continued)

FOREIGN PATENT DOCUMENTS

| EP | 2386967 B1 | 9/2017 |
|---|---|---|
| EP | 3267335 B1 | 2/2019 |

(Continued)

OTHER PUBLICATIONS

EPO: Extended European Search Report, relating to EP Application No. 21213623.8 dated May 23, 2022.

(Continued)

*Primary Examiner* — El Hadji M Sall
(74) *Attorney, Agent, or Firm* — Rowand LLP

(57) ABSTRACT

A computer-implemented method comprises receiving a subscription request from at least one subscriber, the subscription request defining one or more subscription parameters; obtaining one or more events from at least one publisher; marshalling the one or more events according to the one or more subscription parameters; and delivering the one or more events to the subscriber based on the marshalling.

20 Claims, 4 Drawing Sheets

(56) References Cited

U.S. PATENT DOCUMENTS

| | | | |
|---|---|---|---|
| 2007/0156487 A1* | 7/2007 | Sanabria | G06F 9/4488 705/7.26 |
| 2007/0162511 A1* | 7/2007 | Venkatesan | G06F 16/21 |
| 2007/0168420 A1* | 7/2007 | Morris | H04L 67/26 709/204 |
| 2007/0266392 A1 | 11/2007 | Thoelke | |
| 2008/0133541 A1* | 6/2008 | Fletcher | G06F 16/367 |
| 2008/0294794 A1 | 11/2008 | Darugar et al. | |
| 2009/0240829 A1 | 9/2009 | Hildebrand | |
| 2012/0030292 A1 | 2/2012 | John et al. | |
| 2012/0096476 A1 | 4/2012 | Lee | |
| 2017/0031599 A1 | 2/2017 | Bowman et al. | |
| 2017/0180289 A1 | 6/2017 | Chiappone et al. | |
| 2020/0001471 A1* | 1/2020 | Chen | B25J 13/081 |

FOREIGN PATENT DOCUMENTS

| | | |
|---|---|---|
| EP | 3471348 B1 | 12/2020 |
| WO | 2009055752 A2 | 4/2009 |

OTHER PUBLICATIONS

Rigoudy et al.: "Introducing Pub/Sub as a new notification channel in Cloud Monitoring"; https://cloud.google.com/blog/products/management-tools/how-to-use-pubsub-as-a-cloud-monitoring-notification-channel; dated Jun. 22, 2020.

Google Cloud: "Pub/Sub for Application & Data Integration", retrieved from https://cloud.google.com/pubsub/ on May 17, 2022.

Google Cloud: "What is Pub/Sub?" retrieved from https://cloud.google.com/pubsub/docs/overview on May 17, 2022.

Google Cloud Tech: "Cloud Pub/Sub in a minute", https://www.youtube.com/watch?v=jLI-84UjZLE posted on Dec. 28, 2020.

Google Cloud Tech: "Cloud Pub/Sub Overview—ep. 1", https://www.youtube.com/watch?v=cvu53CnZmGI posted on Oct. 30, 2019.

Google Cloud Tech: "What is Cloud Pub/Sub?—ep. 2", https://www.youtube.com/watch?v=MjEam95VLil, posted on Nov. 28, 2019.

Google Cloud Tech: "Cloud Pub/Sub in Action—ep. 3", https://www.youtube.com/watch?v=f5DOsB7NlwO, posted on Dec. 10, 2019.

Google Cloud Tech: "Cloud Pub/Sub Publishers—ep. 4", https://www.youtube.com/watch?v=ML6P1ksHcqo, posted on Jan. 4, 2020.

Google Cloud Tech: "Cloud Pub/Sub Subscribers—ep. 5", https://www.youtube.com/watch?v=nQ9_Xur2aM4, posted on Jan. 12, 2020.

Google Could Tech: "Push or Pull Subscriber? ep. 6", https://www.youtube.com/watch?v=KObJkda4ZfY, posted on Jan. 19, 2020.

Google Cloud Tech: "Receiving messages using Pull—ep. 7", https://www.youtube.com/watch?v=cCkwo6eEHIg, posted on Feb. 28, 2020.

Google Cloud Tech: "Receiving Messages using Push to Cloud Function—ep. 8", https://www.youtube.com/watch?v=k8IBOV-nRXI, posted on Mar. 6, 2020.

Google Cloud Tech: "Using Cloud Pub/Sub with Cloud Run—ep. 9", https://www.youtube.com/watch? v=ZI9ndn2obDk, posted on Mar. 13, 2020.

Google Cloud Tech: "Replying and discarding messages—ep. 10", https://www.youtube.com/watch? v=VyLmmamuOVo, posted on Mar. 27, 2020.

Google Cloud Tech: "Choosing Pub Sub or Pub Sub Lite? ep. 11", https://www.youtube.com/watch? v=fgVE1OoJ2XI, posted on Jun. 30, 2021.

* cited by examiner

METHOD FOR MARSHALLING EVENTS IN A PUBLISH-SUBSCRIBE SYSTEM

TECHNICAL FIELD

The present disclosure relates to publish-subscribe systems and in particular to a method for marshalling events in a publish-subscribe system.

BACKGROUND

A publish-subscribe system may allow publishers to publish events associated with topics that may be distributed to many recipients known as subscribers. Rather than sending publish events to specific receivers, each publish event is associated with one or more topics. Subscribers interested in one or more topics may elect to receive publish events by subscribing to topics of interest, with or without knowledge of the publishers.

In many publish-subscribe systems, publishers post events to an intermediary event broker or event bus, and subscribers register subscriptions with that broker. The broker performs a store and forward function to route events from publishers to subscribers.

In many situations, subscribers may not wish to receive events according to the store and forward function.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
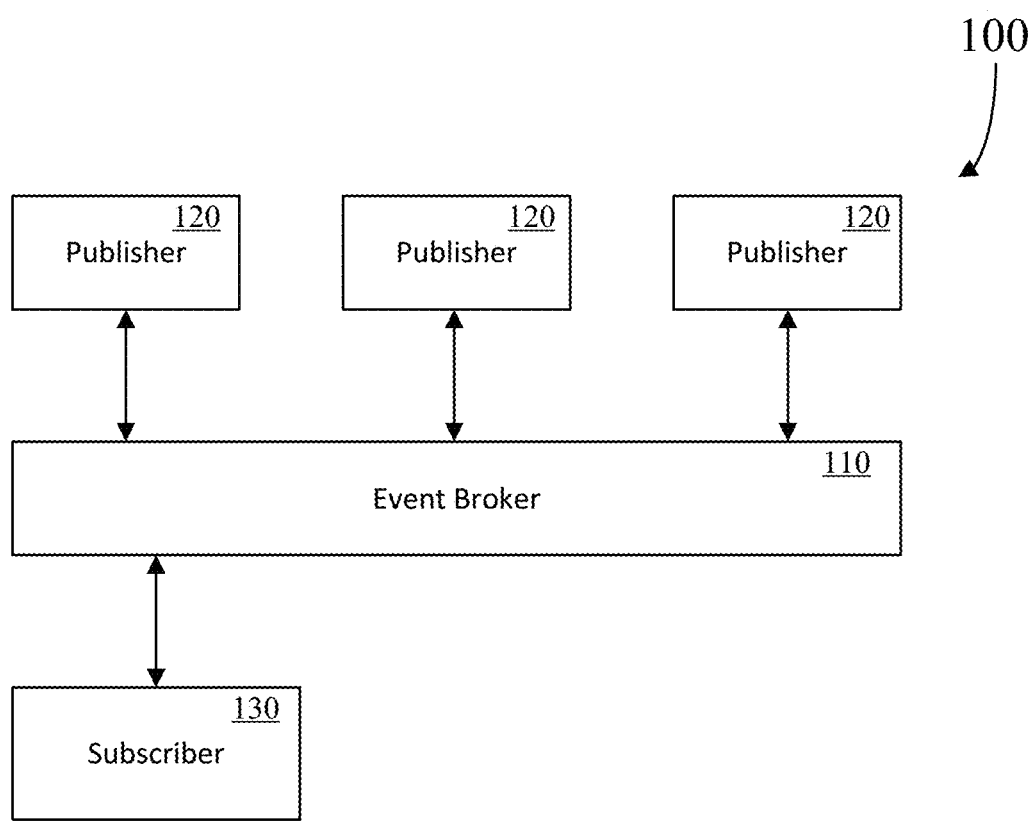
FIG. 1 shows a high-level block diagram of a publish-subscribe system according to an embodiment.

Accordingly, in one aspect there is provided a computer-implemented method comprising receiving a subscription request from at least one subscriber, the subscription request defining one or more subscription parameters; obtaining one or more events from at least publisher, marshalling the one or more events according to the one or more subscription parameters, and delivering the one or more events to the subscriber based on the marshalling.

In one or more embodiments, the marshalling comprises: for each obtained event, manipulating the event based on the one or more subscription parameters; and storing the manipulated event as part of an event block in an event queue.

In one or more embodiments, each event block includes a plurality of events.

In one or more embodiments, the marshalling comprises: for each event block, manipulating the plurality of events based on the one or more subscription parameters.

In one or more embodiments, the one or more subscription parameters include batching one or more of the events together.

In one or more embodiments, the one or more subscription parameters include an event receive rate.

In one or more embodiments, the one or more subscription parameters include combining one or more of the events into a single event.

In one or more embodiments, combining one or more of the events into a single event comprises determining an average of the one or more events and setting the determined average as the single event.

In one or more embodiments, the at least one subscriber includes a machine learning model.

According to another aspect there is provided a system comprising at least one processor; and a memory coupled to the at least one processor and storing instructions that, when executed by the at least one processor, configure the at least one processor to: receive a subscription request from at least one subscriber, the subscription request defining one or more subscription parameters; obtain one or more events from at least one publisher; marshal the one or more events according to the one or more subscription parameters; and deliver the one or more events to the subscriber based on the marshalling.

In one or more embodiments, the marshalling comprises: for each obtained event, manipulate the event based on the one or more subscription parameters; and store the manipulated event as part of an event block in an event queue.

In one or more embodiments, each event block includes a plurality of events.

In one or more embodiments, the marshalling comprises: for each event block, manipulate the plurality of events based on the one or more subscription parameters.

In one or more embodiments, the one or more subscription parameters include batching one or more of the events together.

In one or more embodiments, the one or more subscription parameters include an event receive rate.

In one or more embodiments, the one or more subscription parameters include combining one or more of the events into a single event.

In one or more embodiments, combining one or more of the events into a single event comprises determining an average of the one or more events and setting the determined average as the single event.

In one or more embodiments, the at least one subscriber includes a machine learning model.

According to another aspect there is provided a non-transitory computer readable storage medium comprising computer-executable instructions which, when executed, configure a processor to receive a subscription request from at least one subscriber, the subscription request defining one or more subscription parameters; obtain one or more events from at least one publisher, marshal the one or more events according to the one or more subscription parameters, and deliver the one or more events to the subscriber based on the marshalling.

In one or more embodiments, the one or more subscription parameters include at least one of: batching one or more of the events together; an event receive rate; or combining one or more of the events into a single event.

Other example embodiments of the present disclosure will be apparent to those of ordinary skill in the art from a review of the following detailed description in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a high-level block diagram of a publish-subscribe system 100 according to an embodiment. As can be seen, the publish-subscribe system 100 comprises an event broker 110, publishers 120 and subscriber 130.

The event broker 110, the publishers 120 and the subscriber 130 are processes running on computer systems. The publishers 120 may be referred to as publishing computer systems and the subscriber may be referred to as a subscribing computer system. Although in FIG. 1, three (3) publishers 120 and one (1) subscriber are shown, it will be appreciated that this is for illustrative purposes only and that any number of publishers 120 and subscribers 130 may be included in the publish-subscribe system 100.

In this embodiment, the subscriber 130 includes a machine learning model that receives data-bearing events as input. The machine learning model may be trained using training data. Once trained, the machine learning model may generate predictions on the data-bearing events, which may be referred to as an inference.

In this embodiment, the event broker 110 is coupled to the publishers 120 and the subscriber 130 through a network, which may include a public network such as the Internet and/or a private network. The event broker 110, publishers 120 and the subscriber 130 may be in geographically disparate locations. Put differently, the event broker 110, the publishers 120 and the subscriber may be located remote from one another. Further, each publisher 120 may be located remote from the other publishers 120. It will be appreciated that the event broker 110, publishers 120 and the subscriber 130 may be located on the same computer system and connected, for example, via inter-process communication. In the event that the event broker 110, publishers 120 and subscriber 130 are located on the same computer system, they may still be referred to as, for example, a publishing computer system, a subscribing computer system, etc.

The publishers 120 and the subscriber 130 may be coupled via the event broker 110 without knowledge of one another. In the publish-subscribe system 100, the event broker 110 provides functionality to route data-bearing events, which may be referred to as events, between the publishers 120 and the subscriber 130. Publishers 120 may publish events to the event broker 110 through a publish application programming interface. The publish events are associated with a particular topic. Subscriber 130 may transmit subscription requests through a subscription management application programming interface. The subscription requests include a topic of interest and may define one or more subscription parameters. As will be described in more detail, the event broker 110 is configured to marshal published events received from the publishers 120 according to the particular topic and subscription parameters defined by the subscriber 130 and deliver the publish events to the subscriber 130.

Figure 2:
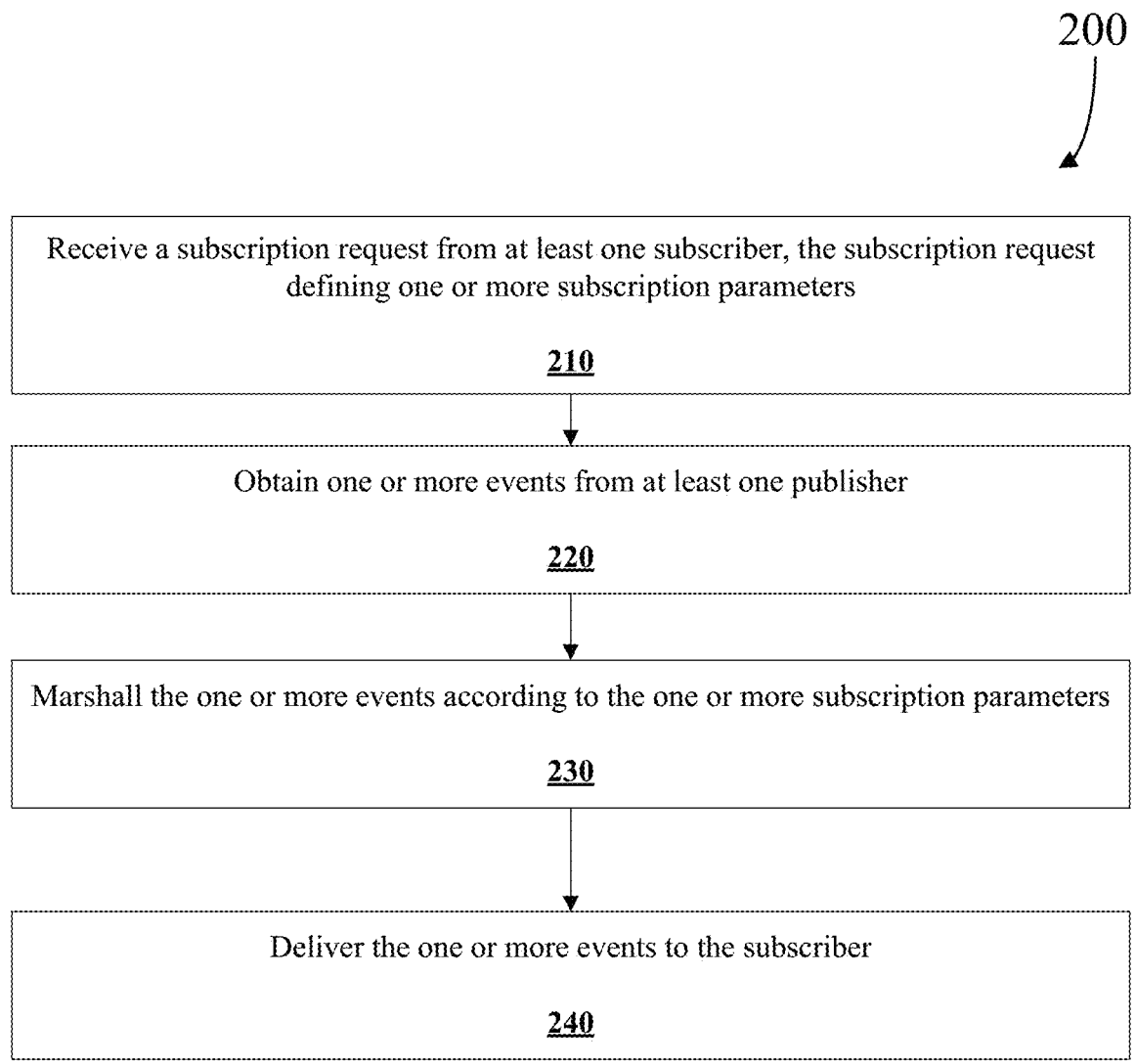
FIG. 2 provides a flow chart illustrating a method for marshalling events according to an embodiment.

FIG. 2 is a flowchart showing operations performed by the event broker 110 according to an embodiment. The operations may be included in a method 200 which may be performed by the event broker 110. For example, computer-executable instructions stored in memory of the event broker 110 may, when executed by the processor of the event broker 110, configure the event broker 110 to perform the method 200 or a portion thereof.

The event broker 110 receives a subscription request from at least one subscriber, the subscription request defining one or more subscription parameters (step 210). In this embodiment, the at least one subscriber is subscriber 130 which, as described above, includes the machine learning model.

The subscription request includes a topic of interest that is used to identify events the subscriber would like to receive. The topic of interest may be a particular category or type of event. For example, the topic of interest may be based on numerical data and may be related to, for example, vehicle data, network traffic data, manufacturing data, etc. Where the topic of interest relates to vehicle data, the vehicle data may be associated with one or more vehicles such as for example motor vehicles (e.g. automobiles, cars, trucks, buses, motorcycles, etc.), aircraft (e.g. airplanes, unmanned aerial vehicles, unmanned aircraft systems, drones, helicopters, etc.), spacecraft (e.g. spaceplanes, space shuttles, space capsules, space stations, satellites, etc.), watercraft (e.g. ships, boats, hovercraft, submarines, etc.), railed vehicles (e.g. trains, trams, etc.), and other types of vehicles including any combinations of any of the foregoing, whether currently existing or arising. Where the topic of interest relates to vehicle data, the topic of interest may include vehicle speed, vehicle acceleration, etc.

The one or more subscription parameters specify how the subscriber 130 would like to receive the events. Put another way, the one or more subscription parameters define how the events are to be marshalled by the event broker 110 prior to delivery.

In this embodiment, the one or more subscription parameters include batching one or more events together, an event receive rate, and/or combining one or more events into a single event. To batch one or more events together, the event broker 110 may merge multiple events into a single event. The event receive rate defines a rate as to how the subscriber 130 would like to receive the events. For example, the subscription parameters may define an event receive rate as one event per second. To combine one or more events into a single event, an average value of the one or more events may be determined and the single event may be set as the determined average value.

The event broker 110 maintains an event pipeline for each subscription request. The event pipeline contains events that are to be delivered to the subscribing computer system.

The event broker 110 obtains one or more events from at least one publisher (step 220). In this embodiment, the at least one publisher is the publisher 120 described above.

Each event obtained by the event broker 110 is associated with a particular topic. The event broker 110 determines that an event is to be sent to the subscriber based on the topic. For example, when the particular topic of a received event matches the topic of interest included with the subscription request, the event broker 110 determines that the event is to be delivered to the subscriber and routes the event to the event pipeline for that subscription.

Within the event pipeline, the event broker 110 marshals the one or more events according to the one or more subscription parameters (step 230).

In this embodiment, the marshalling includes multiple phases. A first phase, which may be referred to as per-event logic, includes event manipulation each time a new event is received and routed to the event pipeline. For example, the subscriber may only want to receive one (1) event per second and the publisher may publish five (5) events per second. As such, the per-event logic may calculate an average of the received (5) events and may send the calculated average as the requested one (1) event per second. It will be appreciated that rather than calculating an average, the event broker 110 may determine a minimum value, a maximum value, may calculate a weighted-moving average, etc.

A further phase, which may be referred to as the event queue, stores the manipulated events to facilitate any batching that may be required. For example, the one or more subscription parameters may require that three (3) messages be batched together and as such the event broker 110 may batch three events stored in the event queue together. The batched events may be stored together as an event block.

A further phase, which may be referred to as per-batch logic, includes event block manipulation for each event block. For example, the requested number of events may be retrieved from the event queue and dispatched to the subscribing computer system. The event block may be assigned a batch ID, timestamp, etc.

The event broker 110 delivers the event block that includes one or more events to the subscriber based on the marshalling (step 240). As mentioned, the one or more subscription parameters may include an event receive rate and as such the one or more events may be delivered to the subscriber at the event receive rate.

The subscriber submits subscription parameters to the event broker 110 defining how it would like to receive subscribed events. Using method 200, the event broker 110 manages events obtained from the publishers to ensure the events are delivered to the subscriber according to the subscription parameters. In this manner, the subscriber is able to execute the machine learning model to perform inference on the received events without wasting computer processing power on event marshalling. Put another way, since event marshalling is performed by the event broker 110, the subscriber is able to focus computer processing power on performing inference on the received events.

Figure 3:
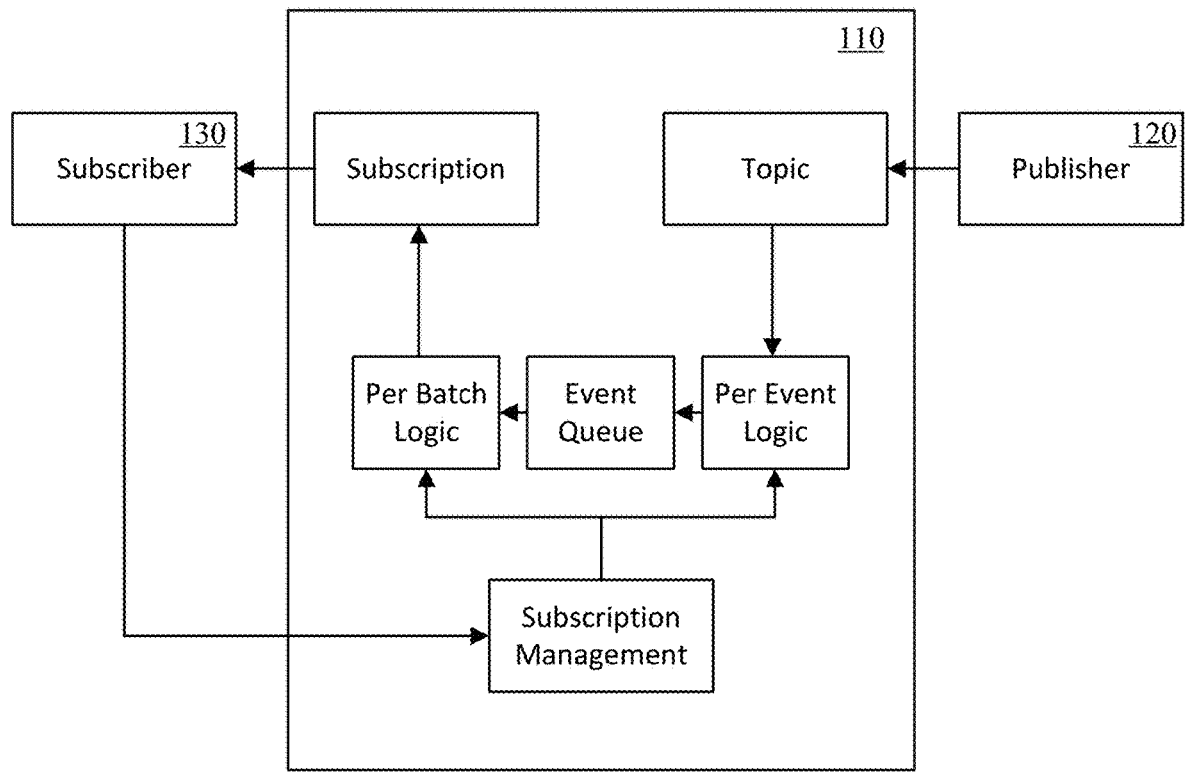
FIG. 3 provides a logic flow diagram for marshalling events according to an embodiment.

FIG. 3 is a logic flow diagram for marshalling events. The subscriber 130 sends a subscription request to the event broker 110. The subscription request includes a topic of interest and defines one or more subscription parameters.

The publisher 120 sends an event associated with a particular topic to the event broker 110. Based on the topic, the publisher 120 identifies one or more subscribers that are to receive the event. For each subscription, the event is routed for marshalling according to the one or more subscription parameters. The event is marshalled according to the one or more subscription parameters via the per-event logic, event queue and the per-batch logic. The event is then delivered by the event broker 110 to the subscriber 130.

Although in embodiments the subscriber 130 is described as defining the one or more subscription parameters prior to receiving the events, it will be appreciated that the subscriber 130 may update or change one or more of the subscription parameters. For example, the subscriber 130 may change the event receive rate. In this example, the updated subscription parameters are sent to the event broker 110 and the event broker 110 applies the updated subscription parameters to all events that have not yet been delivered to the subscriber 130, and to all future events that are to be delivered to the subscriber 130.

In another embodiment, prior to sending the events to the subscriber 130, the event broker 110 may send a notification to the subscriber 130 indicating that one or more events are available. In response, the subscriber 130 may send a request for the stored events. The request may define the one or more subscription parameters and the event broker 110 may apply marshalling to the stored events in accordance with the one or more subscription parameters prior to delivery. This may be repeated each time one or more events are received by the event broker 110.

An example of using the above-described method and system will now be described. An example publisher 120 may include a component on a vehicle that publishes vehicle data indicating the speed the vehicle is travelling at. The publisher 120 may send the speed the vehicle is travelling at a rate of five (5) times per second. A subscriber 130 may include a machine learning component that subscribes to the vehicle data. The subscription parameters may indicate that the subscriber 130 would like to receive the vehicle data at a rate of one (1) time per second. As such, the event broker 110 may calculate the average speed at a rate of one time per second, where the average is based on the five (5) values received per second. The calculated average is then sent to the subscriber 130 at the requested rate of one (1) time per second.

As another example, the subscription parameters may indicate that the subscriber 130 requires sixty (60) seconds worth of vehicle data received at a rate of one (1) per minute, rather than receiving vehicle data at a rate of one (1) time per second. Put another way, the subscription parameters may require sixty (60) events at a time, where each event is still one (1) event per second. In this example, the event broker 110 averages the vehicle data received from the publisher 120 at a rate of five (5) times per second to calculate the requested one (1) time per second. The sixty (60) calculated averages are batched together and delivered to the subscriber 130 at the requested rate of one (1) per minute.

It will be appreciated that in the above example the vehicle data may indicate other values such as speed, acceleration, angular velocity, direction, etc. Further, rather than calculating the average of the values, the minimum of the values may be determined, the maximum of the values may be determined, etc. and this may be requested by the subscriber 130 in the subscription parameters.

Figure 4:
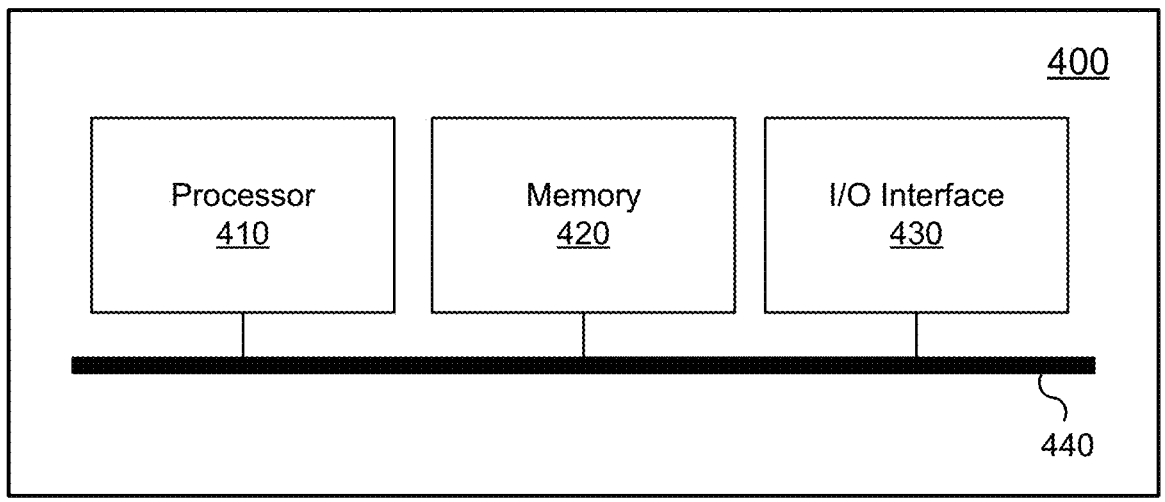
FIG. 4 shows a high-level block diagram of an example computing device according to an embodiment.

As mentioned, the event broker 110, the publishers 120 and the subscriber 130 are processes running on one or more computer systems. FIG. 4 shows a high-level block diagram of an example computer system. In this example, the computing system comprises an example computing device 400. As illustrated, the example computing device 400 includes a processor 410, a memory 420, and an I/O interface 430. The foregoing modules of the example computing device 400 are in communication over and communicatively coupled to one another by a bus 440.

The processor 410 includes a hardware processor and may, for example, include one or more processors using ARM, x86, MIPS, or PowerPC™ instruction sets. For example, the processor 110 may include Intel™ Core™ processors, Qualcomm™ Snapdragon™ processors, or the like.

The memory 420 comprises a physical memory. The memory 420 may include random access memory, read-only memory, persistent storage such as, for example, flash memory, a solid-state drive or the like. Read-only memory and persistent storage are a computer-readable medium and, more particularly, may each be considered a non-transitory computer-readable storage medium. A computer-readable medium may be organized using a file system such as may be administered by software governing overall operation of the example computing device 400.

The I/O interface 430 is an input/output interface. The I/O interface 430 allows the example computing device 400 to receive input and provide output. For example, the I/O interface 430 may allow the example computing device 400 to receive input from or provide output to a user. In another example, the I/O interface 430 may allow the example computing device 400 to communicate with a computer network. The I/O interface 430 may serve to interconnect the example computing device 400 with one or more I/O devices such as, for example, a keyboard, a display screen, a pointing device like a mouse or a trackball, a fingerprint reader, a communications module, a hardware security module (HSM) (e.g., a trusted platform module (TPM)), or the like. Virtual counterparts of the I/O interface 430 and/or devices accessed via the I/O interface 430 may be provided such as, for example, by a host operating system.

Software comprising instructions is executed by the processor 410 from a computer-readable medium. For example, software corresponding to a host operating system may be loaded into random-access memory from persistent storage or flash memory of the memory 420. Additionally or alternatively, software may be executed by the processor 410 directly from read-only memory of the memory 420. In another example, software may be accessed via the I/O interface 430.

It will be appreciated that it may be that some or all of the above-described operations of the various above-described example methods may be performed in orders other than those illustrated and/or may be performed concurrently without varying the overall operation of those methods.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A computer-implemented method comprising:
   receiving a subscription request from at least one subscriber, the subscription request defining one or more subscription parameters;
   obtaining one or more events from at least one publisher;
   marshalling the one or more events according to the one or more subscription parameters; and
   delivering the one or more events to the subscriber based on the marshalling.

2. The method of claim 1, wherein the marshalling comprises:
   for each obtained event, manipulating the event based on the one or more subscription parameters; and
   storing the manipulated event as part of an event block in an event queue.

3. The method of claim 2, wherein each event block includes a plurality of events.

4. The method of claim 3, wherein the marshalling comprises:
   for each event block, manipulating the plurality of events based on the one or more subscription parameters.

5. The method of claim 1, wherein the one or more subscription parameters include batching one or more of the events together.

6. The method of claim 1, wherein the one or more subscription parameters include an event receive rate.

7. The method of claim 1, wherein the one or more subscription parameters include combining one or more of the events into a single event.

8. The method of claim 7, wherein combining one or more of the events into a single event comprises determining an average of the one or more events and setting the determined average as the single event.

9. The method of claim 1, wherein the at least one subscriber includes a machine learning model.

10. A system comprising:
    at least one processor; and
    a memory coupled to the at least one processor and storing instructions that, when executed by the at least one processor, configure the at least one processor to:
    receive a subscription request from at least one subscriber, the subscription request defining one or more subscription parameters;
    obtain one or more events from at least one publisher;
    marshal the one or more events according to the one or more subscription parameters; and
    deliver the one or more events to the subscriber based on the marshalling.

11. The system of claim 10, wherein to marshal the one or more events comprises:
    for each obtained event, manipulate the event based on the one or more subscription parameters; and
    store the manipulated event as part of an event block in an event queue.

12. The system of claim 11, wherein each event block includes a plurality of events.

13. The system of claim 12, wherein to marshal the one or more events comprises:
    for each event block, manipulate the plurality of events based on the one or more subscription parameters.

14. The system of claim 10, wherein the one or more subscription parameters include batching one or more of the events together.

15. The system of claim 10, wherein the one or more subscription parameters include an event receive rate.

16. The system of claim 10, wherein the one or more subscription parameters include combining one or more of the events into a single event.

17. The system of claim 16, wherein combining one or more of the events into a single event comprises determining an average of the one or more events and setting the determined average as the single event.

18. The system of claim 10, wherein the at least one subscriber includes a machine learning model.

19. A non-transitory computer readable storage medium comprising computer-executable instructions which, when executed, configure a processor to:
    receive a subscription request from at least one subscriber, the subscription request defining one or more subscription parameters;
    obtain one or more events from at least one publisher;
    marshal the one or more events according to the one or more subscription parameters; and
    deliver the one or more events to the subscriber based on the marshalling.

20. The non-transitory computer readable storage medium of claim 19, wherein the one or more subscription parameters include at least one of:
  batching one or more of the events together;
  an event receive rate; or
  combining one or more of the events into a single event.

\* \* \* \* \*